March 2, 1954  G. M. JONES  2,670,647
RIVETED HANDLE
Filed Nov. 8, 1950
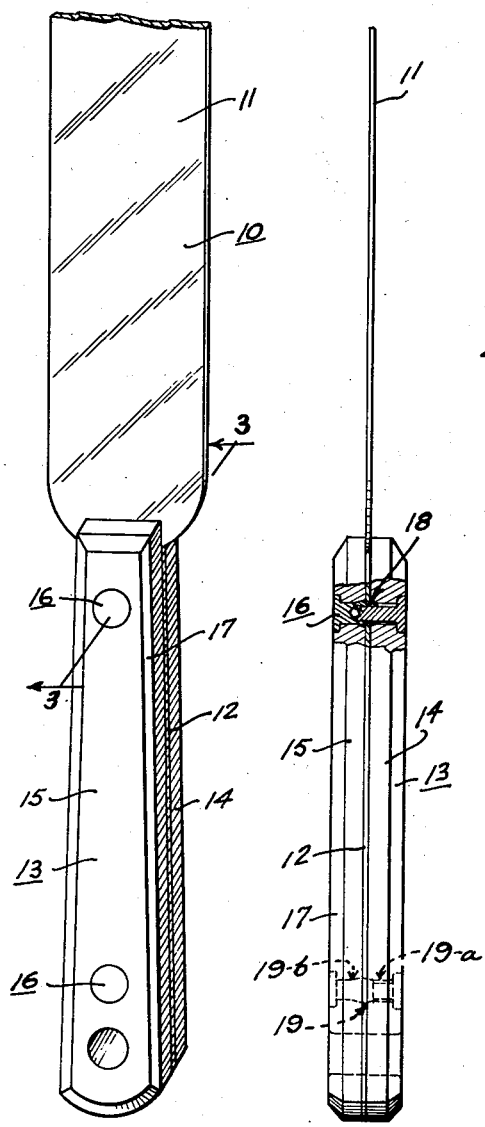
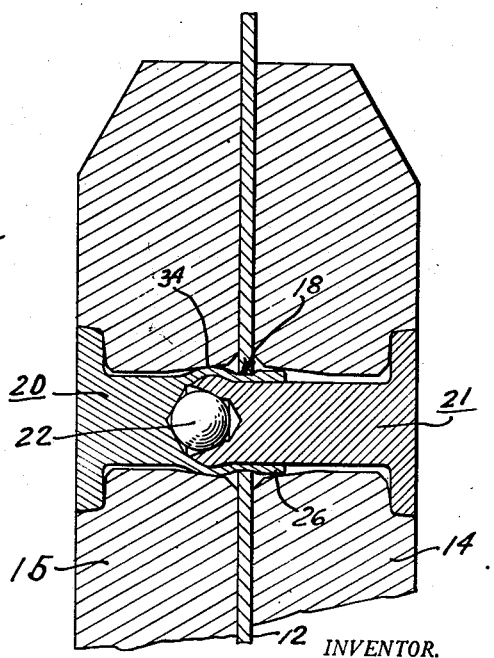
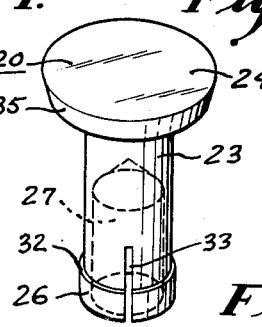
Fig. 1.  Fig. 2.  Fig. 3.  Fig. 4.  Fig. 5.
INVENTOR.
GEORGE M. JONES
BY Leonard L. Kalish
ATTORNEY.

Patented Mar. 2, 1954

2,670,647

UNITED STATES PATENT OFFICE 2,670,647

RIVETED HANDLE

George M. Jones, Jenkintown Manor, Pa.

Application November 8, 1950, Serial No. 194,638

4 Claims. (Cl. 85—40)

The present invention relates to a riveted handle-construction and particularly to a handle for relatively small hand-utensils such as garden tools, kitchen-ware, table-ware or the like.

The present invention relates more particularly to a laminated-handle particularly adapted for use on culinary instruments or the like.

An object of the present invention is to provide a laminated handle-grip whereby securely to hold the blade-portion or operating end of a hand-tool, formed of relatively thin sheet material.

Another object of the present invention is to provide a laminated-handle which is firmly, rigidly and immovably secured to the tang of a hand-tool whereby to eliminate the annoying relative movement between handle and tool so common in utensils not of the present invention.

A further object of the present invention is to provide means for securing enlarged handle-portions to each side of the tang of a hand-tool or the like, each handle-portion securely interlocked with the tang of the tool and with each other.

Still another object of the present invention is to provide rigid interlocking means for the plies of laminated articles whereby to prevent relative movement therebetween.

Further objects will be apparent by reference to the appended specification, claims and drawings.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the drawings wherein like reference characters indicate like parts:

Figure 1 represents a perspective view of the handle and a portion of the blade of a kitchen utensil such as a spatula or the like.

Figure 2 represents a side elevational view, partly in section, of the utensil shown in Figure 1.

Figure 3 represents a cross-sectional view taken generally along the line 3—3 of Figure 1, but showing the handle interlocking means of the present invention during the assembly thereof.

Figure 4 represents an enlarged cross-sectional view, similar to Figure 3, but showing the handle interlocking means fully assembled.

Figure 5 represents a perspective view of the female rivet-member of the handle-securing means.

The handle-construction of the present invention is illustrated by picturing a kitchen utensil manufactured of relatively flat sheet-metal, such as a spatula or the like, but it is to be understood that the present invention may be adapted to provide multi-ply structures of various materials such as plastic, sheet metal, wood, etc. and may also be adapted for use with plies of the same thickness or varying thickness and may be used for handle-portions of tools, utensils or instruments of varying sizes and shapes, and need not be limited to handle-portions of sheet-metal kitchen utensils.

The utensil 10 may include an operating-portion or blade 11 having a tang 12 at one end—said tang adapted to receive and have secured thereto a handle 13 which consists of the plies 14 and 15 secured thereto by the fastening means 16.

The handle-plies 14 and 15 may be made of plastic material suitably beveled as at 17 and having generally the same outline as the tang 12. However, the handle-plies 14 and 15 may be made of any material having heat-resistant properties and any other properties, such as resilience, resistance to abrasion and deformation, color, etc. which will provide a decorative as well as a utilitarian handle.

The tang 12 of the utensil 10 has a plurality of holes 18 and 19 therein and the handle-plies 14 and 15 have holes 18-a, 18-b, 19-a and 19-b adapted to be aligned therewith. The holes 18, 18-a, 18-b, 19, 19-a and 19-b are adapted to receive therein the fastening means 16.

The handle securing means 16 consists of a female rivet-member 20 and male rivet-member 21, and a hardened steel ball 22. The female rivet-member has a shank 23 adapted to enter the holes in the handle-plies 14 and 15 and the tang 12 and has an enlarged head-portion 24 which is adapted to fit in a counterbore or recess 25. The shank 23 has a raised annular collar or rib 26 at the end thereof and has a bore 27 adapted to receive the hardened steel ball 22 therein. The outer diameter of the shank 23 is generally slightly less than the diameter of the holes 18-a, 18-b, 19-a and 19-b and generally the same as the diameter of the holes 18 and 19. The outer diameter of the collar 26 is slightly in excess of the diameter of the holes 18 or 19.

The male rivet-member 21 has a shank 28 having an external diameter generally the same as the internal diameter of the bore 27 of the female rivet-member 20, with a slightly tapered end 29 to facilitate the entry of the shank 28 into the bore 27, and has an enlarged head-portion 30 adapted to seat in one of the counterbores or recesses 25, and a bore 31 at the end of the shank 28.

The hardened steel ball 22 has a diameter somewhat less than the internal diameter of the bore 27 but somewhat larger than the internal diameter of the bore 31.

The rivets 20 and 21 and adapted to cooperate and interlock with each other and with the handle-plies 14 and 15 and the tang 12 in the manner shown particularly in Figures 3 and 4. Thus, the handle-ply 15 may be placed adjacent the tang 12 with the holes 18–b and 19–b aligned with the holes 18 and 19, respectively, and a pair of female rivet-members 20 may be inserted into the holes 18–b and 19–b and into the holes 18 and 19 so that the enlarged head-portion 24 seats in the counterbore 25 and the collar-portion 26 passes through the opening 18 or 19 and secured behind the tang by the shoulder portion 32 (formed between the shank 23 and the collar 26). The shank 23 may be resilient whereby to permit the collar 26 to pass through the smaller-diameter holes 18 or 19. If preferred, one or more axial slits 33 may be formed in the collar 26 at the end of the shank 23 to permit the circumferential dimension of the collar 26 to be reduced as it is forced through the holes 18 or 19. Thereafter, the resilient material of which the female rivet-member is made permits the collar 26 to snap outwardly into place behind the tang 12.

A material suitable for the rivet-members is nickel silver, but any material having the required physical properties may be used.

After the handle-ply 15 is secured to the tang 12 by the female rivet-member 20, the hardened steel ball 22 may be inserted into the bore 27. Then, the handle-ply 14 may be placed adjacent the tang 12 with the holes 18–a and 19–a aligned with the holes 18 and 19, respectively, and the male rivet-member 21 may be inserted so that the tapered end 29 enters the bore 27 and the outer edge of the bore 31 engages the hardened steel ball 22, as is shown particularly in Figure 3.

Thereafter the male rivet-member 21 is forcefully urged toward the female rivet-member 20 whereby to force the hardened steel ball 22 into the bore 31. This causes a deformation and spreading of the outer annular edge of the shank 28 around the ball 22 and against the inner wall of the bore 27, causing an outward annular deformation or bulge 34 in the shank 23 in the area around the ball 22. This annular bulge 34 takes place between the collar-portion 26 and the enlarged head-portion 24, and more particularly between the head 24 and the tang 12, and generally nearer the tang 12. Thus, the tang 12 is wedged between the shoulder 32 of the collar 26 and the annular bulge 34. Moreover, inasmuch as the shank 28 of the male rivet-member 21 prevents the collar 26 from contracting, the rivet 20 cannot be withdrawn through the hole 18 in the tang 12, and the handle-ply 15 is securely held against the tang 12. Similarly, the outer edge of the shank 28 (where it has been deformed annularly around the ball 22 into the annular bulge 34 of the rivet 20) has become larger in diameter than the internal diameter of the outer end of the bore 27, and thus the rivet 21 is prevented from being withdrawn from the bore 27, whereby securely to hold the handle-ply 14 against the tang 12.

Thus, the securing means 16 securely inter- locks the handle-plies 14 and 15 and the tang 12 whereby to prevent relative movement between the handle-plies 14 and 15 and the tang 12.

The peripheral edge 35 of the enlarged head-portions of the rivets 20 and 21 may be frusto-conical and the counterbores 25, around the periphery thereof, may be similarly tapered, though on a slightly smaller diameter, so that there is a wedging action between the enlarged heads 24 and 30 and the handle-plies 14 and 15, whereby to prevent relative movement laterally between the rivets and the handle-plies.

By the handle-construction of the present invention, there is provided a multi-ply handle rigidly and immovably secured to the tang of a utensil. The rivets, hardened steel ball and handle-plies easily may be fabricated and assembled, according to the present invention, to provide an inexpensive and trouble-free handle.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described my invention, I claim as new and desire to protect by Letters Patent the following:

1. In the multi-ply handle having two outer plies and an inner ply and concentric apertures through said plies and with the aperture in said inner ply being smaller in diameter than the apertures in the rest of the plies: a three piece connector comprising a male rivet-member, a female rivet-member and a ball, said female rivet-member having a head and having a shank, said shank being substantially cylindrical and having a shoulder at the end thereof of larger outer diameter than the diameter of said shank, said female rivet-member having a bore therein, said shank having a slit therein constructed and arranged to permit reduction in the diameter of said shoulder, said ball disposed within the bore of said female rivet-member, said male rivet-member having a head and having a shank of substantially the same outer diameter as the diameter of said bore and fitted into the bore of said female rivet-member, the shank of the said male rivet-member preventing contraction of the shoulder of said female rivet-member, a bore in the shank of said male rivet-member of smaller diameter than the diameter of said ball, the inner end of said male rivet-member being expanded radially outwardly by said ball when said male rivet-member is forced into the bore of said female rivet-member and said ball is forced into said second bore, the expanded inner end of said shank of said male rivet-member expanding radially outwardly the shank of said female rivet-member between said shoulder and the head of said female rivet-member.

2. In a multi-ply handle having two outer plies and an inner ply and concentric apertures through said plies and with the aperture in said inner ply being smaller in diameter than the apertures in the rest of the plies; a three-piece connector comprising a male rivet-member, a female rivet-member and a ball, said female rivet-member having a frusto-conical head and having a shank, said shank being substantially cylindrical and having a shoulder at the end thereof of larger outer diameter than the diameter of said shank, said female rivet-member having a bore therein, said shank having a slit therein constructed and arranged to permit reduction in the diameter of said shoulder, said ball disposed within the bore of said female rivet-member, said male rivet-member having a frusto-conical head and having a shank of substantially the same outer diameter as the diameter of said bore and fitted into the bore of said female rivet-member, the shank of the said male rivet-member preventing contraction of the shoulder of said female rivet-member, a bore in the shank of said male rivet-member of smaller diameter than the diameter of said ball, the inner end of said male rivet-member being expanded radially outwardly by said ball when said male rivet-member is forced into the bore of said female rivet-member and said ball is forced into said second bore, the expanded inner end of said shank of said male rivet-member expanding radially outwardly the shank of said female rivet-member between said shoulder and the head of said female rivet-member.

3. In a multi-ply handle having two outer plies and an inner ply and concentric apertures through said plies and with the aperture in said inner ply being smaller in diameter than the apertures in the rest of the plies; a three-piece connector comprising a male rivet-member, a female rivet-member and a ball, said female rivet-member having a head and having a resilient shank, said shank being substantially cylindrical and having a shoulder at the end there of of larger outer diameter than the diameter of said shank, said female rivet-member having a bore therein, said shank having a slit therein constructed and arranged to permit reduction in the diameter of said shoulder, said ball disposed within the bore of said female rivet-member, said male rivet-member having a head and having a shank of substantially the same outer diameter as the diameter of said bore and fitted ino the bore of said female rivet-member, the shank of the said male rivet-member preventing contraction of the shoulder of said female rivet-member, a bore in the shank of said male rivet-member of smaller diameter than the diameter of said ball, the inner end of said male rivet-member being expanded radially outwardly by said ball when said male rivet-member is forced into the bore of said female rivet-member and said ball is forced into said second bore, the expanded inner end of said shank of said male rivet-member expanding radially outwardly the shank of said female rivet-member between said shoulder and the head of said female rivet-member.

4. In a multi-ply handle having two outer plies and an inner ply and concentric apertures through said plies and with the aperture in said inner ply being smaller in diameter than the apertures in the rest of the plies; a three-piece connector comprising a male rivet-member, a female rivet-member and a ball, said female rivet-member having a frusto-conical head and having a resilient shank, said shank being substantially cylindrical and having a shoulder at the end thereof of larger outer diameter than the diameter of said shank, said female rivet-member having a bore therein, said shank having a slit therein constructed and arranged to permit reduction in the diameter of said shoulder, said ball disposed within the bore of said female rivet-member, said male rivet-member having a frusto-conical head and having a shank of substantially the same outer diameter as the diameter of said bore and fitted ino the bore of said female rivet-member, the shank of the said male rivet-member preventing contraction of the shoulder of said female rivet-member, a bore in the shank of said male rivet-member of smaller diameter than the diameter of said ball, the inner end of said male rivet-member being expanded radially outwardly by said ball when said male rivet-member is forced into the bore of said female rivet-member and said ball is forced into said second bore, the expanded inner end of said shank of said male rivet-member expanding radially outwardly the shank of said female rivet-member between said shoulder and the head of said female rivet-member.

GEORGE M. JONES.

References Cited in the file of this patent

UNITED STATES PATENTS

| Number | Name | Date |
|---|---|---|
| 585,274 | Lyda | June 29, 1897 |
| 751,902 | Dodge | Feb. 9, 1904 |
| 1,993,170 | Havener | Mar. 5, 1935 |